United States Patent
Doherty et al.

(10) Patent No.: US 10,692,531 B2
(45) Date of Patent: Jun. 23, 2020

(54) METHODS FOR SERVING INTERACTIVE CONTENT TO A USER

(71) Applicant: Yieldmo, Inc., New York, NY (US)

(72) Inventors: Connor Doherty, New York, NY (US); Farid Jawde, New York, NY (US); David Sebag, New York, NY (US); Michael Yavonditte, New York, NY (US)

(73) Assignee: Yieldmo, Inc., New York, NY (US)

( * ) Notice: Subject to any disclaimer, the term of this patent is extended or adjusted under 35 U.S.C. 154(b) by 0 days.

(21) Appl. No.: 15/872,688

(22) Filed: Jan. 16, 2018

(65) Prior Publication Data

US 2018/0197575 A1    Jul. 12, 2018

Related U.S. Application Data

(63) Continuation-in-part of application No. 15/048,994, filed on Feb. 19, 2016, now abandoned, and a
(Continued)

(51) Int. Cl.
*G06Q 30/00* (2012.01)
*G11B 27/00* (2006.01)
(Continued)

(52) U.S. Cl.
CPC .......... *G11B 27/005* (2013.01); *G06F 3/0485* (2013.01); *G06F 3/0488* (2013.01); *G06F 3/04812* (2013.01); *G06F 40/106* (2020.01); *G06F 40/14* (2020.01); *G06Q 30/02* (2013.01); *G06Q 30/0207* (2013.01); *G06Q 30/0241* (2013.01); *G06Q 30/0276* (2013.01); *G11B 27/102* (2013.01); *G11B 27/11* (2013.01); *G11B 27/3081* (2013.01); *G11B 27/34* (2013.01); *H04N 21/4333* (2013.01);
(Continued)

(58) Field of Classification Search
USPC ...................................... 705/14.61
See application file for complete search history.

(56) References Cited

U.S. PATENT DOCUMENTS

| 7,796,837 B2 * | 9/2010 | Lueck ................. G06F 16/9577 |
| | | 382/286 |
| 2009/0119706 A1 * | 5/2009 | Hope ................... G11B 27/034 |
| | | 725/38 |

(Continued)

*Primary Examiner* — Yehdega Retta
(74) *Attorney, Agent, or Firm* — Run8 Patent Group, LLC; Peter Miller; Leag Raddatz

(57) ABSTRACT

One variation of a method for generating and distributing digital advertising content includes: accessing a static asset including a set of objects representing advertising content; extracting the set of objects from the static asset; generating a set of frames, an object in the set of objects inserted into each frame in the set of frames; defining an order for presenting the set of frames to a viewer; at a visual element loaded into a window of a first computing device, sequentially rendering the set of frames according to the order responsive to an interaction at the first computing device that moves the visual element within the window; and, based on the interaction, generating an engagement metric for a user interacting with the visual element at the first computing device.

20 Claims, 9 Drawing Sheets

Related U.S. Application Data continuation-in-part of application No. 15/466,603, filed on Mar. 22, 2017, which is a continuation of application No. 15/217,879, filed on Jul. 22, 2016, now Pat. No. 9,852,759, and a continuation-in-part of application No. PCT/US2015/064460, filed on Dec. 8, 2015.

(60) Provisional application No. 62/119,176, filed on Feb. 21, 2015, provisional application No. 62/197,929, filed on Jul. 28, 2015, provisional application No. 62/068,646, filed on Oct. 25, 2014.

(51) Int. Cl.
| | | |
|---|---|---|
| *G11B 27/10* | (2006.01) | |
| *H04N 21/433* | (2011.01) | |
| *G11B 27/30* | (2006.01) | |
| *G11B 27/11* | (2006.01) | |
| *H04N 21/442* | (2011.01) | |
| *G06F 3/0488* | (2013.01) | |
| *G06F 3/0481* | (2013.01) | |
| *G06F 3/0485* | (2013.01) | |
| *G06Q 30/02* | (2012.01) | |
| *G11B 27/34* | (2006.01) | |
| *G06F 40/14* | (2020.01) | |
| *G06F 40/106* | (2020.01) | |
| *H04N 21/482* | (2011.01) | |
| *H04N 21/431* | (2011.01) | |
| *H04N 21/472* | (2011.01) | |
| *H04N 21/81* | (2011.01) | |
| *H04L 29/08* | (2006.01) | |

(52) U.S. Cl.
CPC ....... *H04N 21/44204* (2013.01); *H04L 67/02* (2013.01); *H04N 21/431* (2013.01); *H04N 21/44218* (2013.01); *H04N 21/47217* (2013.01); *H04N 21/482* (2013.01); *H04N 21/812* (2013.01)

(56) References Cited

U.S. PATENT DOCUMENTS

| | | | | |
|---|---|---|---|---|
| 2012/0044251 A1* | 2/2012 | Mark | ............... | G06F 3/0485 345/474 |
| 2013/0305170 A1* | 11/2013 | de Souza | ............. | G06F 3/0485 715/760 |
| 2013/0344961 A1* | 12/2013 | Iannetta | ................ | G09G 5/026 463/36 |

\* cited by examiner

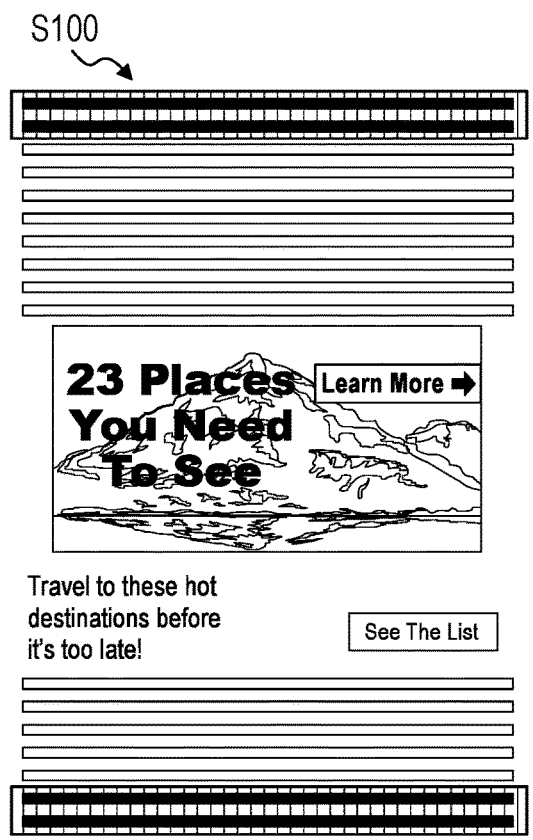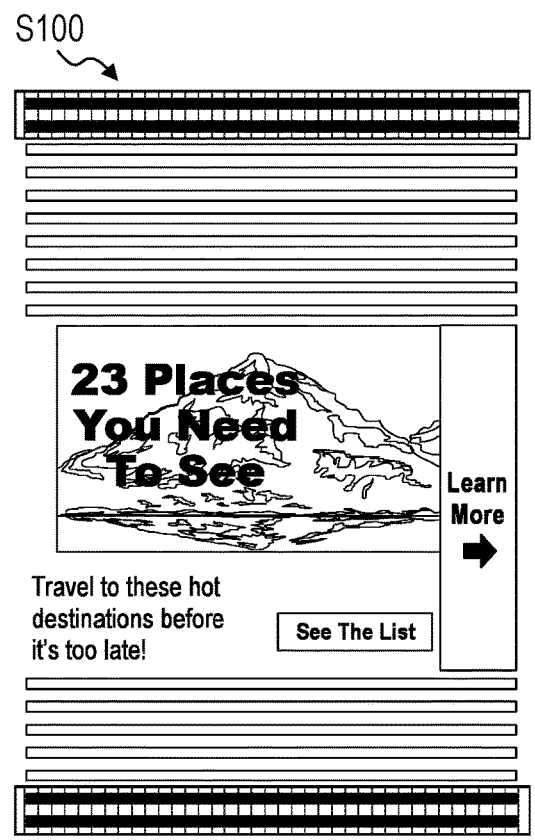
FIG. 7A
FIG. 7B

METHODS FOR SERVING INTERACTIVE CONTENT TO A USER

CROSS-REFERENCE TO RELATED APPLICATIONS

This Application is a continuation-in-part application of U.S. patent application Ser. No. 15/048,994, filed on 19 Feb. 2016, which claims the benefit of U.S. Provisional Application No. 62/119,176, filed on 21 Feb. 2015, both of which are incorporated in their entireties by this reference.

This Application is a continuation-in-part application of U.S. patent application Ser. No. 15/466,603, filed on 22 Mar. 2017, which is a continuation application of U.S. patent application Ser. No. 15/217,879, filed on 22 Jul. 2016, which claims the benefit of U.S. Provisional Application No. 62/197,929, filed on 28 Jul. 2015 and is a continuation-in-part (or "bypass") application of PCT Application No. PCT/US15/64460, filed on 8 Dec. 2014, which claims priority to U.S. Provisional Application No. 62/068,646, filed on 25 Oct. 2014, all of which are incorporated in their entireties by this reference.

The Application is related to U.S. patent application Ser. No. 14/592,883, filed on 8 Jan. 2015, which claims priority to U.S. Provisional Application No. 62/068,646, filed on 25 Oct. 2014, both which are incorporated in their entireties by this reference.

TECHNICAL FIELD

This invention relates generally to the field of mobile advertising and more specifically to a new and useful method for serving interactive advertising content to a user in the field of mobile advertising.

BRIEF DESCRIPTION OF THE FIGURES

FIGS. 7A and 7B are schematic representations of a variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
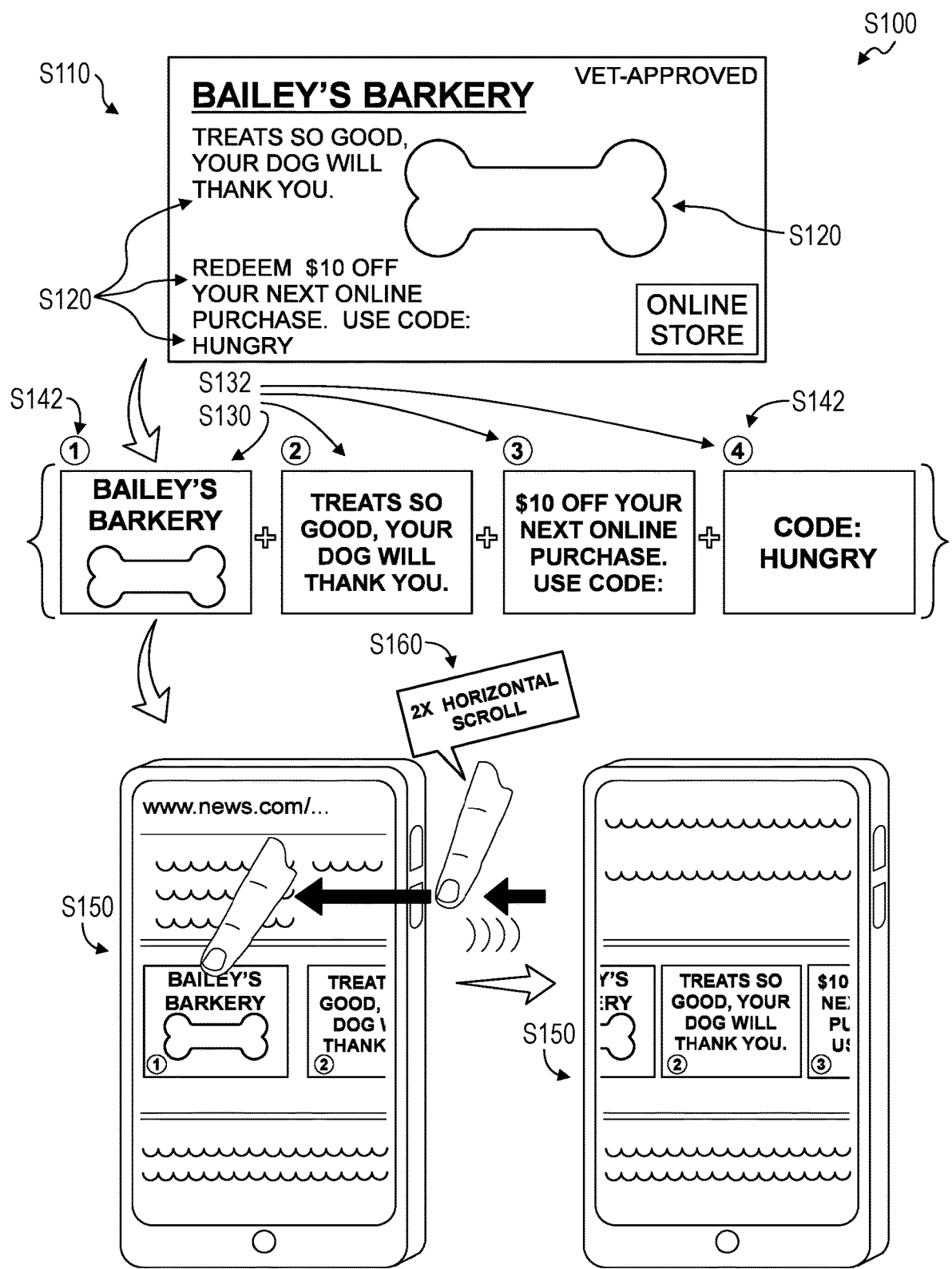
FIGS. 1A, 1B, and 1C are flowchart representations of a method.

As shown in FIG. 1A, a method S100 for generating and distributing advertising content includes: accessing a static asset including a set of objects representing advertising content in Block S110; extracting the set of objects from the static asset in Block S120; generating a set of frames, an object in the set of objects inserted into each frame in the set of frames in Block S130; defining an order for presenting the set of frames to a viewer in Block S142; at a visual element loaded into a window of a first computing device, sequentially rendering the set of frames according to the order responsive to an interaction at the first computing device that moves the visual element within the window in Block S150; and, based on the interaction, generating an engagement metric for a user interacting with the visual element at the first computing device in Block S160.

Figure 1B:
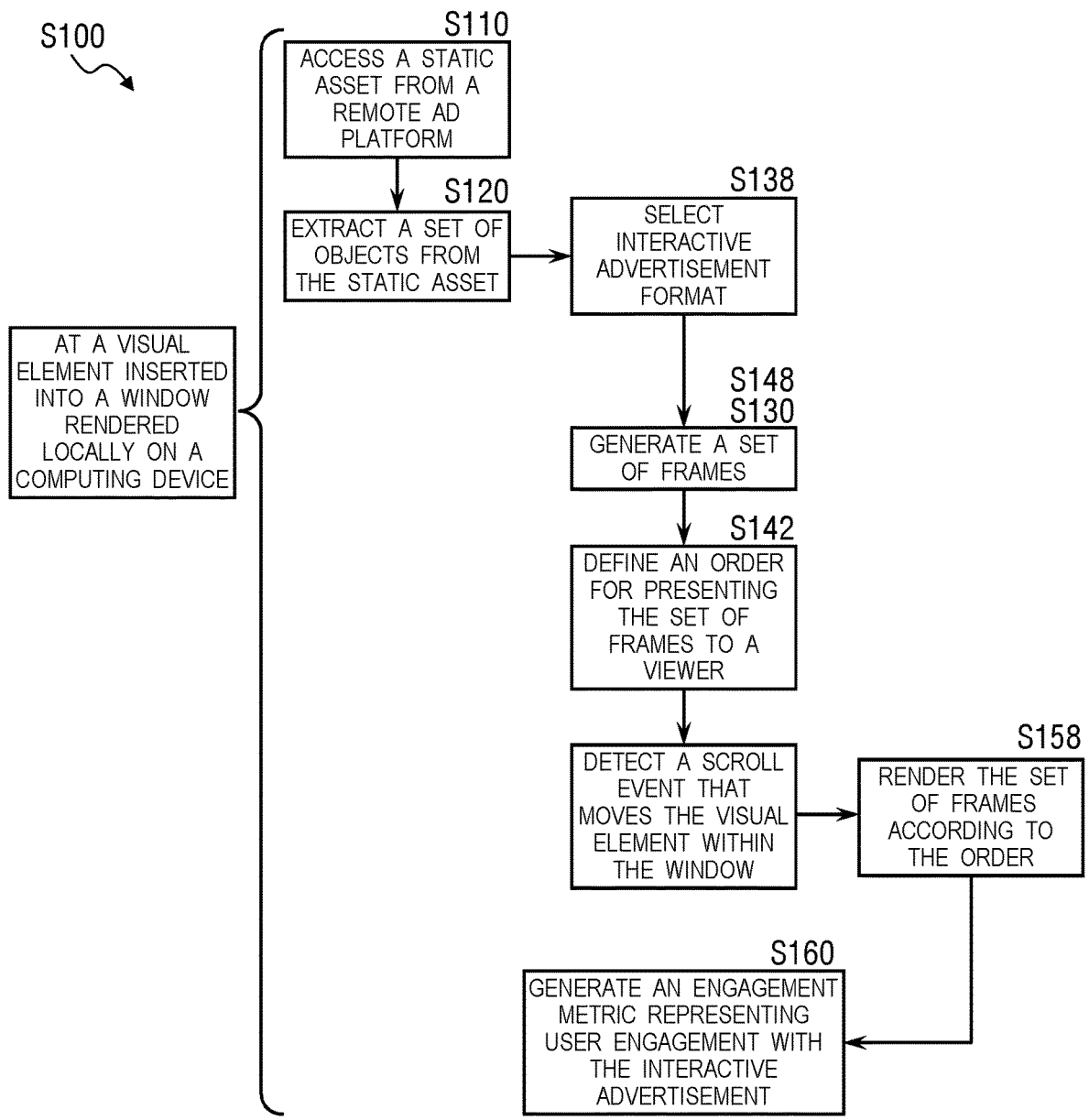
Figure 1C:
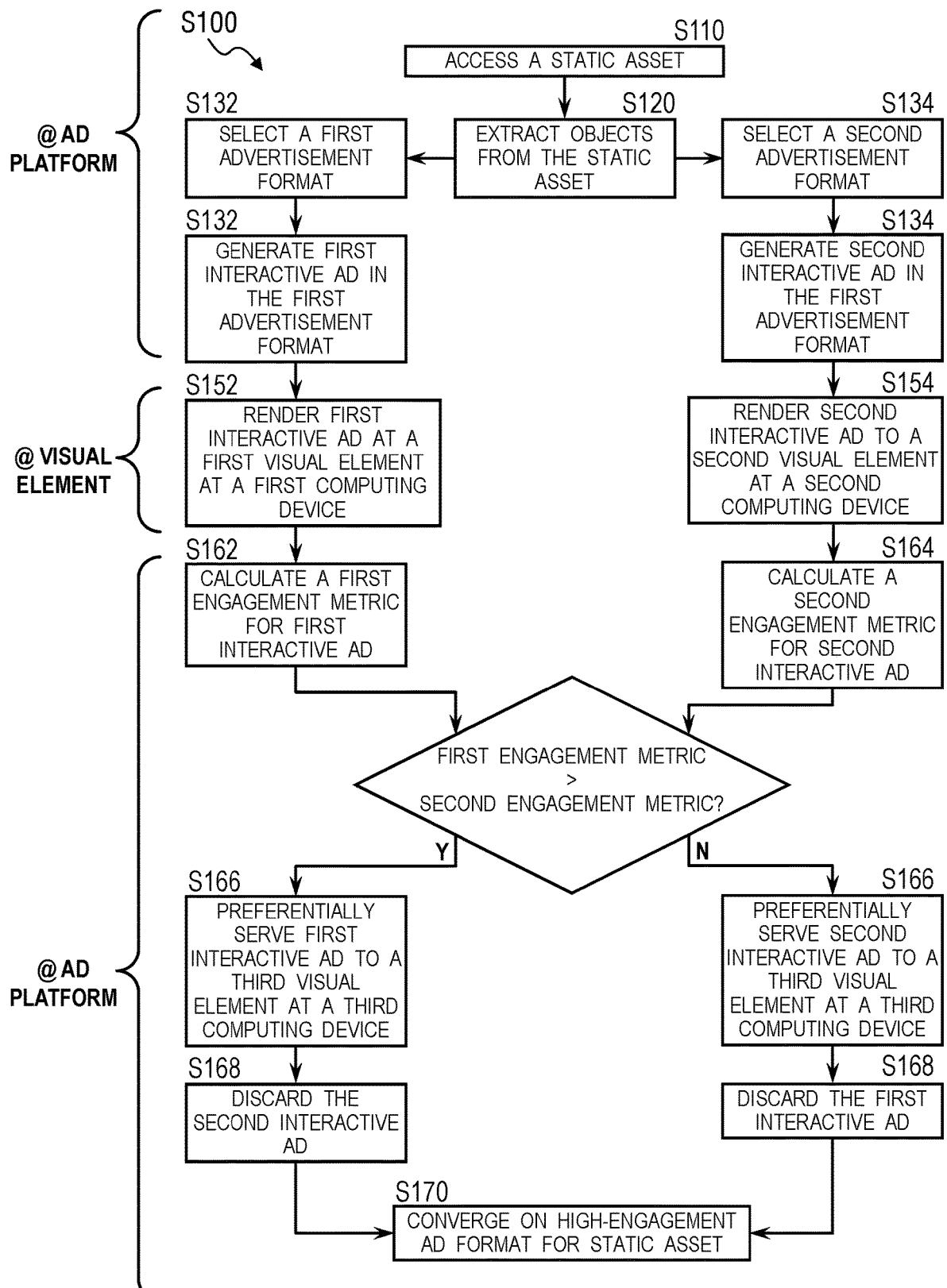
Figure 2:
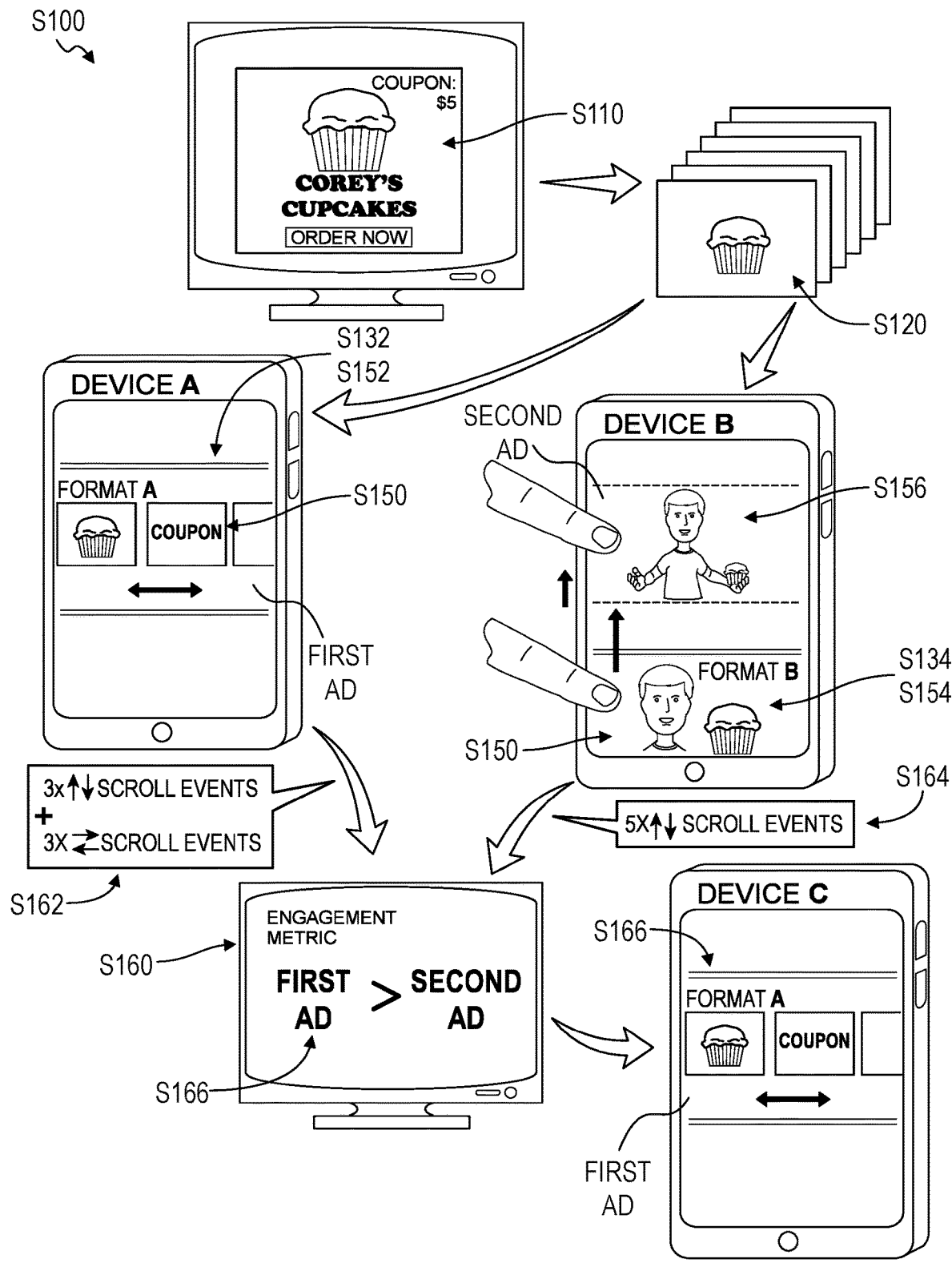
FIG. 2 is a flowchart representation of a variation of the method.

One variation of the method S100 shown in FIGS. 1C and 2 includes, at a remote computer system: accessing a static asset comprising a set of objects representing advertising content in Block S110; transforming the static asset into a first interactive advertisement according to a first advertisement format, the first advertisement format defining animation of a set of frames within the visual element responsive to a change of position of the visual element within the window in Block S132; and transforming the static asset into a second interactive advertisement according to a second advertisement format, the second advertisement format defining animation of a single frame within the visual element responsive to a change of position of the visual element within the window in Block S134. Furthermore, the variation of the method S100 includes, at a first visual element rendered in a window rendered on a display of a first computing device in a distributed network of computing devices: during a first time window, sequentially rendering the set of frames of the first interactive advertisement within the first visual element according to an order defined for the first interactive advertisement responsive to a first interaction at the first computing device that moves the first visual element within the window in Block S150; based on the first interaction, generating a first engagement metric for a first user interacting with the first interactive advertisement rendered in the first visual element at the first computing device in Block S162. Additionally, the variation includes, at a second visual element rendered in a window rendered on a display of a second computing device in the distributed network of computing devices: during the first time window, rendering the single frame of the second interactive advertisement within the second visual element in Block S154; during the first time window, animating the single frame responsive to a second interaction at the second computing device that moves the second visual element within the window in Block S156; and, based on the second interaction, generating a second engagement metric for a second user interacting with the second interactive advertisement rendered in the second visual element at the second computing device in Block S164. The variation also includes, in response to the first engagement metric exceeding the second engagement metric, serving the first interactive advertisement preferentially over the second interactive advertisement to a third computing device in the distributed network of computing devices during a second time window succeeding the first time window Block S166.

2. Applications

Generally, the method S100 can be executed by an advertising (or "ad") platform to transform a static asset (e.g., a static advertisement, a single digital rectilinear image) into a dynamic (e.g., interactive) advertisement and serve this dynamic advertisement to an instance of a visual element inserted into a document accessed on a computing device (e.g., a smartphone, tablet computer, and/or other mobile computing device). As a display of the computing device renders the visual element within a window (i.e., a viewable area of the display), the visual element can format the dynamic advertisement based on the position of the visual element within the window and can animate the dynamic advertisement in response to relocation of the visual element within the window. In particular, an ad platform hosted by a remote computer system can receive a static asset (i.e., a static, non-interactive advertisement) from an ad server, an advertiser, and/or any other internal or external server. The ad platform can identify and label objects, such as faces, colors, text blocks, features, contextual information, etc., within the static asset by implementing computer vision and machine learning techniques to extract key features and objects from the static asset. The ad platform can then: transform these objects into an interactive advertisement of an ad format responsive to scroll events and/or swipe events; and serve the interactive advertisement to a visual element inserted into a webpage or other document rendered in a window displayed on a computing device (e.g., a smartphone, a laptop, and/or any other mobile computing device).

The ad platform can track scroll events that move the visual element within the window, swipe events that shift visual advertising content within the visual element, and/or other interactions that modify advertising content rendered within the visual element to generate a user engagement metric representing user attention to advertising content displayed within the visual element. From the user engagement metric, the ad platform can then evaluate efficacy of the ad format in engaging users with particular advertising content and, therefore, identify a highly-effective interactive format for the advertising content to yield high user attention to the advertising content and improved brand recognition and brand lift.

When serving static assets to computing devices for a user to view, the ad platform can quantify engagement with the static asset by tracking passive interactions with advertising content rendered in the visual element, such as click-through events (e.g., to an external webpage linked to the static asset) and monitoring a duration the static asset remains within view within a window rendered on a display of a computing device. In the absence of a click-through event or other passive interaction, the ad platform may inaccurately gauge a user's interest in advertising content depicted within the static asset due to lack of quantifiable metrics on which to quantify the user's engagement. However, the ad platform can execute Blocks of the method S100 to create an interactive advertisement responsive to scroll-events and other interactions between a user and advertising content rendered within a visual element inserted into a window rendered on a display of a computing device. The ad platform can then base the engagement metric on active interactions with the advertising content, such as scroll-events (e.g., a number of scroll events, duration of scroll events, a number of changes in direction of scroll events). From those scroll interactions, the ad platform can measure engagement and correlate that engagement with the user's interest in the advertising content rendered. Thus, the ad platform can execute Blocks of the method S100 to add a new dimension for quantifying (and/or qualifying) user engagement—and active attention—with advertising content.

Figure 4:
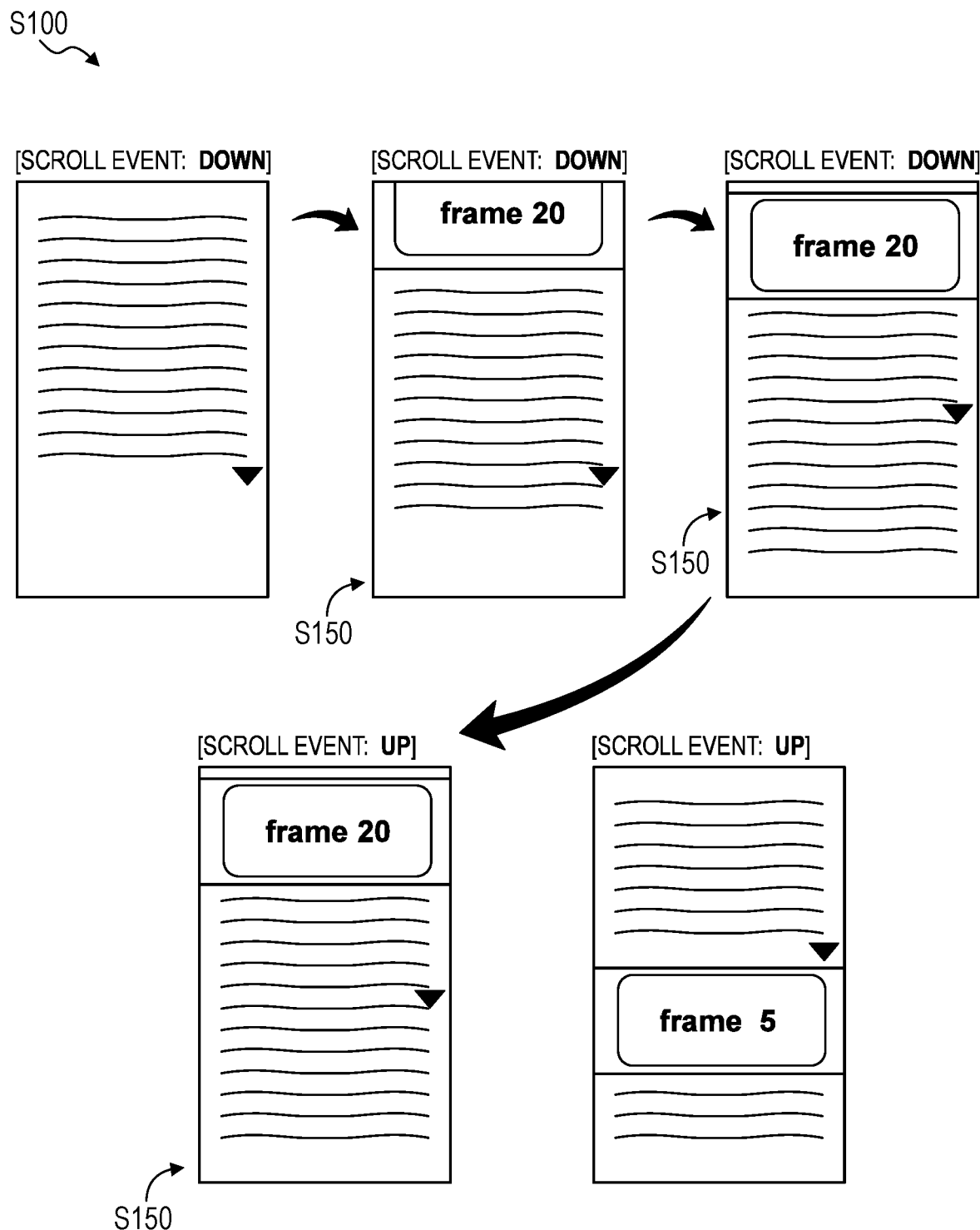
FIG. 4 is a flowchart representation of a variation of the method.

Furthermore, static assets remain passive and unresponsive to user interactions (e.g., scroll event, swipe events, etc.) with content rendered within a window of a computing device. Therefore, static assets may depend on aesthetic objects depicted within the static asset to draw attention to advertising content and brands represented by the advertising content. By rendering static assets at user computing devices, the ad platform places the onus for creating engaging advertisements on marketing and advertising agents, who may manually compile creative advertising content into untested static formats. However, the ad platform can execute various Blocks of the method S100 to transform these static assets into a single- or multi-frame dynamic advertisement—of a dynamic advertisement format—that responds to scrolls and entices the user to scroll the visual element back and forth within the window, as shown in FIG. 4. The ad platform can then quantify efficacy of the dynamic format in engaging attention of individual users and/or groups of users to advertising content by tracking these scroll events. Furthermore, the ad platform can evaluate efficacy of particular advertisement formats in engaging users with particular advertising content—or categories of advertising content—to determine a high-engagement format well-suited to entice users to interaction and pay attention to the advertising content. Therefore, the ad platform can implement Blocks of the method to validate formats of advertising content in order to generate highly effective and engaging advertising content for individual users, groups of users, and/or types of advertising content.

The method S100 is described herein as executed by a remote computer system to transform a static visual ad into an interactive visual ad that is responsive to an additional input mode (e.g., a scroll event that moves the interactive visual ad vertically within a window rendered on a display of a computing device) that can be tracked to estimate user engagement with greater accuracy and resolution. However, the method S100 can be implemented to generate and serve any other type of visual content response to any other interactive input (e.g., a scroll or scroll-like input), such as horizontal scroll events, swipe events that move visual content within the visual element, and/or rotational or actuate gestures applied to a computing device. Furthermore, Blocks of the method S100 can be executed locally and in real-time at a user's computing device to transform a static visual ad into an interactive visual ad that can be immediately displayed for a user.

3. Ad Serving

Figure 3:
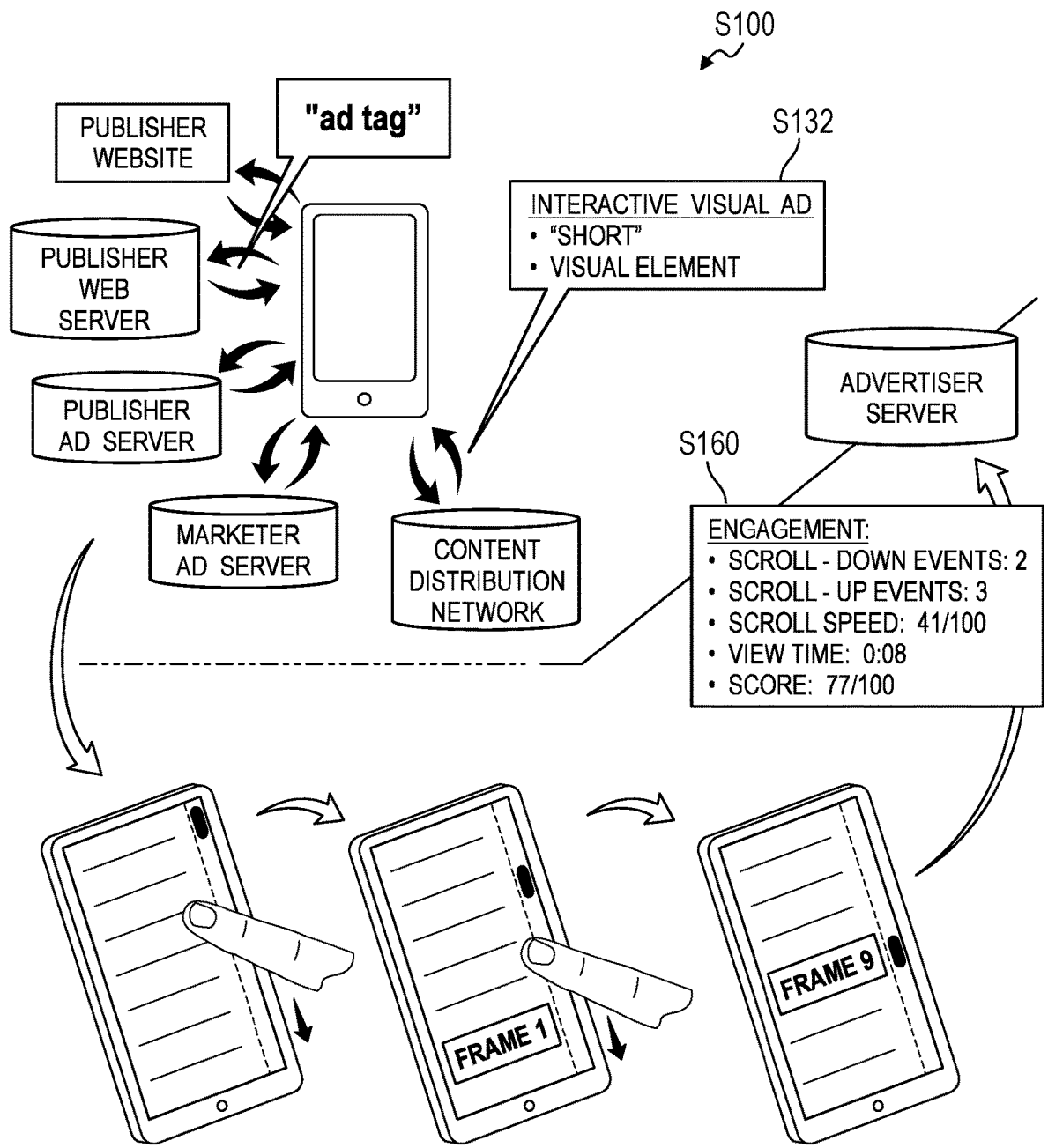
FIG. 3 is a flowchart representation of a variation of the method.

As shown in FIG. 3, various Blocks of the method S100 can be executed by an ad platform hosted on a remote computer system, such as a remote server. In one implementation, the ad platform can retrieve or otherwise access a static asset (e.g., a static graphical advertisement and/or a digital video advertisement) from an internal or external database (e.g., a server or local file storage, such as a browser client) in Block S110. The ad platform (or a local computer system, as described below) can then transform the static asset into an interactive advertisement, as described below. The ad platform can package the interactive advertisement with a visual element that can later be inserted inline within a document (e.g., a webpage or mobile application) and can make the interactive advertisement and visual element package (or "interactive ad") available for download by the advertiser; or upload the interactive advertisement to an ad exchange, to a publisher ad server, to an advertising agency ad server, or to another content distribution network.

Later, when a user navigates to a publisher's webpage via a web browser or to a mobile application via a native application (hereinafter an "app") executing on her smartphone, tablet, or other computing device, a web server hosted by the publisher can return content or pointers to content for the webpage (e.g., in Hypertext Markup Language, or "HTML", or a compiled instance of a code language native to a mobile operating system), including formatting for this content and a publisher ad tag that points the web browser or app to the publisher's ad server (e.g., a network of external cloud servers). The ad server can then implement an ad selector to select a particular static asset (or ad), execute Blocks of the method S100 to transform the static asset into an interactive ad according to a selected ad format as described below, and serve the interactive ad to the web browser or application. In one implementation, the ad server can return the interactive ad directly to the web browser or application. Alternatively, the ad server can return a second ad tag that redirects the browser or app to an advertiser or publisher ad server. The advertiser or publisher ad server can then return a third ad tag that redirects the web browser or app to a content delivery network, which may include a network of cloud servers storing raw creative graphics for the ad, and the content delivery network can return the selected interactive ad to the web browser.

In the foregoing implementation, the ad server or content delivery network, etc. can return the interactive ad in the form of content within an HTML iframe element to the web browser or content within view in the mobile application. The mobile application can then place the iframe element within the webpage or within the window of the app. The visual element can then animate visual content of the interactive ad (e.g., seek through frames in the set of frame within the visual element) based on the position of the visual element shown within a window rendered on a display of the user's computing device according to various Blocks of the first method S100.

4. Extracting Objects

As shown in FIG. 1A, Block S120 of the method S100 recites extracting the set of objects from the static asset. Generally, the ad platform can implement computer vision and machine learning techniques to automatically detect and label features (or "objects") within the static asset, which the ad platform and/or the visual element can then compile into an interactive format as described below.

In one implementation, the ad platform can receive a static asset and identify a set of objects, such as text, a set of colors, locations of faces, images, a set of characteristic and/or context tags, etc., through computer vision techniques, such as optical character recognition (or "OCR"), natural language processing, label detection techniques, face detection techniques, image attributes extraction techniques, etc. The static asset (e.g., a 300-pixel by 250-pixel static advertisement image) can include text blocks, color pallets, images (e.g., images of faces, objects, places), context tags, hyperlinks to external websites, and/or other content related to advertisement of a particular brand and/or product, which the ad platform can then identify, label, and extract from the static asset. For example, a static asset advertising a film can include a hero image representing a character from the film, a quote from the character, dates for release of the film in theaters, a location of theaters in which the film will be shown, a link to the film's website, etc. In the foregoing example, the ad platform can extract locations and context of each text block, a location of a face of the character, contextual labels representing content depicted in the hero image (e.g., "action film," "post-apocalyptic," "dystopian"), and a histogram of colors represented in the image (e.g., frequency of 35% of Hex Color Code #808080—gray, 25% of Hex Color Code #000000—black, 20% of Hex Color Code #FF0000—red, 10% Hex Color Code #CoCoCo—silver).

In one variation, the ad platform can implement OCR techniques to detect text and delineate text blocks by size, color, typeface, formatting, and/or location within the static asset. Then the ad platform can extract these discrete text blocks from the static asset. For example, the ad platform can differentiate between a text block corresponding to a brand logo, a text block representing a coupon code, and a text block representing a brand slogan despite juxtaposition of the three text blocks and extract these text blocks separately from the static asset.

Alternatively, the ad platform can serve the static asset to a third-party feature extractor configured to read in the static asset, extract a set of objects (e.g., colors, text blocks, context tags, and/or other characteristics of the advertising content) from the static asset by implementing computer vision, and serve the set of objects to the ad platform.

However, the ad platform and/or any other third-party platform can extract objects from the static asset by implementing any other method or technique in any other suitable way.

5. Interactive Formats

Blocks S132 and S134 of the method S100 recite transforming the static asset into an interactive advertisement according to an advertisement format, the advertisement format defining animation of a set of frames within the visual element responsive to a change of position of the visual element within the window. Generally, the ad platform can compile the set of objects extracted from the static asset into an interactive advertisement of a predefined format selected to respond to user interactions with the visual element and effectively engage users with advertising content.

In particular, the ad platform can assemble the set of objects into an interactive advertisement according to a predefined advertisement format selected by the ad platform according to an ad formatting rules engine. In one implementation, the ad formatting rules engine, which can be hosted by the ad platform and/or locally at the computing device on which the interactive advertisement is rendered, can define a set of rules governing selection of an appropriate ad format for the static asset, types of objects to include within the interactive advertisement, transformations (or transmutations) of objects extracted from the static asset into the interactive advertisement, formatting and layout of the interactive advertisement, etc.

5.1 Format Selection

The ad platform can select an advertisement format into which the ad platform can compile the set of objects (and/or other characteristics of the static asset) according to the ad formatting rules engine based on criteria such as prior user engagement with ads of the advertisement format (as described below), a number of objects or concentration of features within the static asset, particular characteristics (e.g., type, context, distribution of objects, etc.) of the static asset, etc. The ad formatting rules engine can define a set of advertisement formats characterized by a particular quantity of frames in the set of frames, a particular layout of objects extracted from the static asset within each frame, particular types of objects to be rendered within each frame, a particular order of the frames, and/or animations dictating how frames in the set of frames are rendered within the visual element.

In one implementation, the ad platform can select a predefined advertisement format based on a number of objects extracted from the static asset. For example, in response to a number of objects in the set of objects exceeding a threshold number of objects (e.g., ten objects), the ad platform can generate a single frame which includes all or a subset of objects in the set of objects (as defined in a first advertisement format). The ad platform can then render the single frame in the visual element according to an animation defined by the first advertisement format in response to a scroll event over the visual element. However, in response to the number of objects in the set of objects exceeding the threshold number of objects, the ad platform can generate a set of frames, each frame in the set of frames including objects in the set of objects (as defined in a second advertisement format). The ad platform can then sequentially render each frame in the set of frames—in response to a scroll event over the visual element—according to an order defined for the set of frames by the second advertisement format.

In another implementation, the ad platform can select an advertisement format based on types of objects within the set of objects. Generally, some advertisement formats can more effectively communicate certain types of objects than other advertisement formats. Therefore, the ad platform can select advertisement formats to communicate content of the original static asset and yield high levels of user engagement. In one example shown in FIGS. 3, 4, and 5, the ad platform can detect four or more text blocks within a static asset. For this static asset, the ad platform can select an ad format including four or more frames, each frame including a text block from the static asset. In this example, the visual element indexes through frames in the set of frames at a rate proportional to a scroll-rate of a scroll-event that moves the visual element vertically within a window of the computing device. In this example, the visual element can segment a height of the window (less a height of the visual element) into a number of discrete vertical position ranges equal to the number of frames in the set of frames selected and assign each discrete vertical position range to one frame in the set of frames. Therefore, the visual element can render frames of the interactive advertisement at a frame rate proportional to a rate of scroll-events that move the visual element within the window, mimicking video playback during scroll events.

Figure 5:
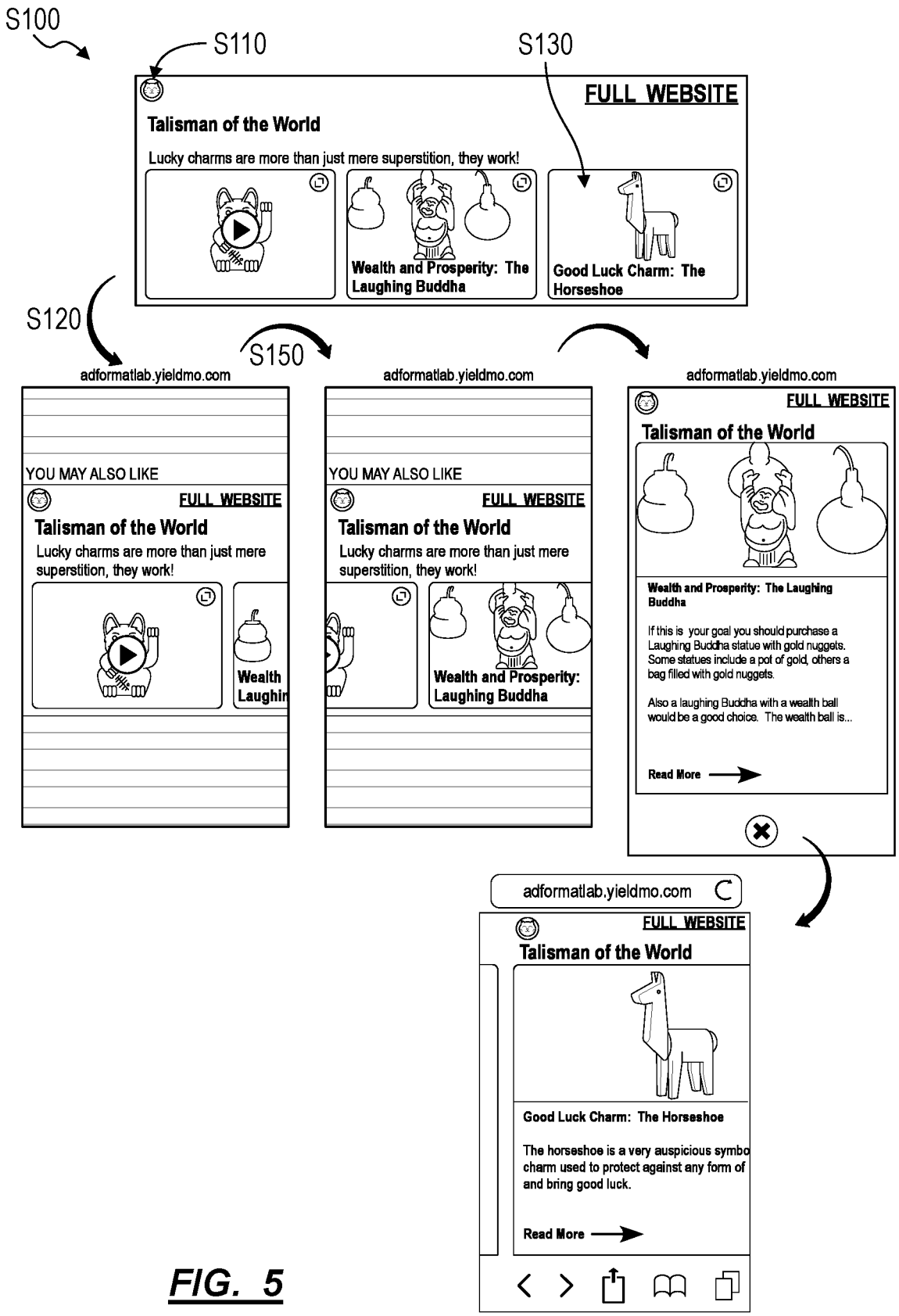
FIG. 5 is a flowchart representation of a variation of the method.
Figure 6:
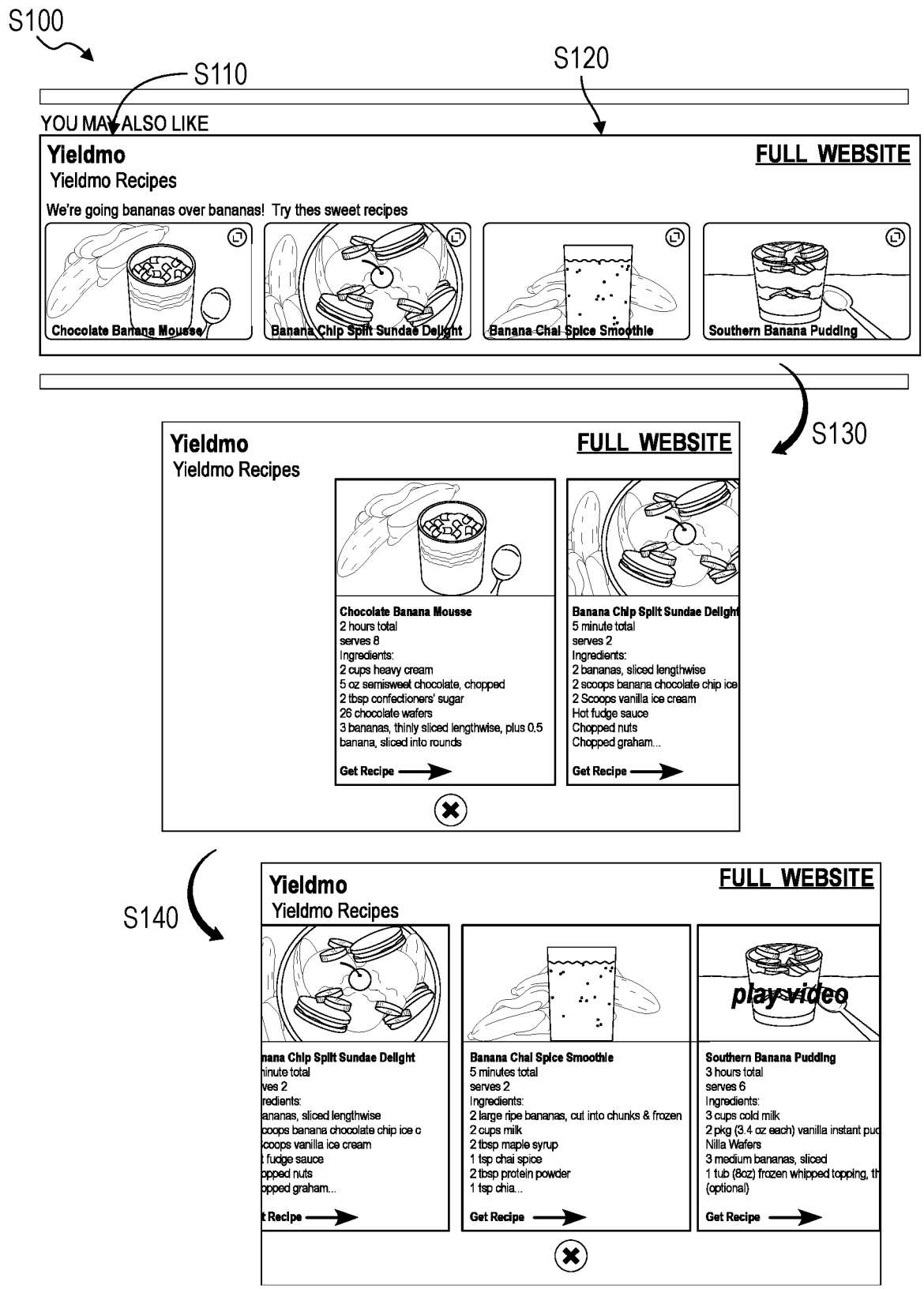
FIG. 6 is a flowchart representation of a variation of the method.

In another example shown in FIGS. 5 and 6, the ad platform can detect a static asset that contains three or more discrete (and delineated) images. Therefore, the ad platform can select an advertisement format that includes three (or more) frames, each frame including one discrete image. In this example, the selected advertisement format can define a horizontal carousel of frames; a user may index through frames of the horizontal carousel by applying a horizontal swipe or scroll across the computing device over the visual element.

In another example shown in FIG. 2, the ad platform can detect a face and fewer than two discrete text blocks within the static asset. The ad platform can select an advertisement format that emphasizes the face: by zooming into the face rendered within the visual element in response to scroll events that move the visual element vertically downward within the window; and by zooming out of the face rendered within the visual element in response to scroll events that move the visual element vertically upward within the window. In this example, the advertisement format can define a single frame into which the image of the static asset (including the face) and the two text blocks are compiled. In response to a scroll event that moves the visual element upward, the visual element can zoom a crop area—centered over a center of the face—out, such that the face is centered within the visual element and reduced in size; in response to a scroll event that moves the visual element downward, the visual element can zoom the crop area in, such that the face is centered within the visual element and enlarged.

In another example, the ad platform can detect that the static asset includes a photograph with indistinguishable text. In this example, the ad platform can select an advertisement format that accentuates the photograph by: inserting a mask area over the photograph in the visual element; dissolving (i.e., fading out or making transparent) the mask area to reveal the photograph in response to a scroll event that moves the visual element upward within the window; and making opaque (or translucent) the mask area to obscure the photograph in response to a scroll event that moves the visual element downward within the window.

However, the ad platform can select an advertisement format according to which the ad platform can transform the static asset into an interactive advertisement in any other suitable way based on any other characteristic or quality of objects within the static asset.

5.2 Multiple Frames

Blocks S130 and S142 of the method recite generating a set of frames, an object in the set of objects inserted into each frame in the set of frames in Block S130; and defining an order for presenting the set of frames to a viewer in Block S142. Generally, the ad platform can compile the set of objects into frames in a set of frames, which the visual element can then sequentially render in response to a user interaction with the visual element. Therefore, the ad platform can divide the static asset into a sequence of interrelated frames and a user can control display of the interrelated frames by applying inputs, such as a scroll-gesture, to the computing device.

In one implementation, the ad platform can assemble a subset of objects within the set of objects extracted from the static asset into a frame according to a frame layout—standard and/or defined by an advertisement format selected by the ad platform. The frame can include text blocks, graphics, colors, standard icons related to contextual information within the static asset, etc. as defined in the subset of objects. For example, a subset of objects can include a text block in black text and an image of a cupcake with rainbow-colored sprinkles. The ad platform can format the text block according to a standard typeface defined for the frame and position the text block in black text over a rainbow-colored frame background. The ad platform can also apply standard bakery-related icons distributed across the frame. Similarly, the ad platform can combine the set of objects with a library (or set) of standard graphics to generate the set of frames. For example, the ad platform can extract a set of objects from a static asset including a text block reciting "Buy one, get one free; enter code: B1G1F" in violet and Comic Sans typeface, a white background, and a hyperlink to an external webpage. The ad platform can compile the set of objects into a standard frame layout (e.g., text block in the upper right corner in Helvetica typeface), which includes a standard button icon that links to the external webpage and a standard color scheme (e.g., black and white). In this example, the ad platform can, therefore, transform any static asset into a standardized interactive format with standardized icons, graphics, color pallets, typefaces, etc.

In another implementation shown in FIGS. 7A and 7B, the ad platform can access the static asset including a link to an external webpage. From the link, the ad platform can generate the set of frames in which a last frame in the set of frames includes a prompt to navigate to the external webpage (i.e., a "call to action") to visually indicate a hyperlink is coupled to the interactive advertisement. However, a user may select any portion of the interactive advertisement to navigate to the external webpage. Generally, in this implementation, the ad platform can identify in the static asset a targeted action (e.g., a click-through event) or result the advertiser desires from a user viewing the interactive advertisement in the visual element. For example, the ad platform can access a static asset advertising sale of a consumer product; from the static asset, the ad platform can identify a target action of converting user attention into a sale of the consumer product. Therefore, the ad platform can generate a frame indicating a price of the consumer product and a direct link to purchase the consumer product at an external website. In another example, the ad platform can access a static asset advertising an up-coming film. From the static asset and objects extracted from the static asset, the ad platform can identify a target action of clicking on the advertisement to play back a trailer for the film. Therefore, the ad platform can generate a frame with an icon (e.g., a clear background icon) identifying a direct link to open the trailer video within a native video player of the computing device and/or play back the trailer video within the frame itself when the frame is in view within the visual element. However, the system can generate a "call to action" frame and/or "call to action" icon inserted into a frame in the set of frames formatted according to any other format model and configured to encourage user attention to advertising content within the visual element and execution of a desired action (e.g., a click-through event). Thus, the system can engage users with the advertising content within the visual element and limit users overlooking or ignoring the visual element due to familiarity with advertising content (or "banner blindness").

The ad platform can then repeat the foregoing methods and techniques until each object in the set of objects is applied to a frame in the set of frames. In one implementation, the ad platform can generate one frame for each text block within the static image. In another implementation, the ad platform can generate one frame for each feature (i.e., text block and/or graphic) within the set of objects. Alternatively, the ad platform can apply an object in the set of objects to multiple frames in the set of frames. For example, the ad platform can extract a brand logo from the static asset and integrate the brand logo into each frame in the set of frames.

In another implementation, an advertisement format can specify: a minimum number of frames (e.g., three); a maximum number of frames (e.g., twenty); and/or a target number of frames (e.g., five). The ad platform can determine group or cluster objects in the set of objects. Based on the number of groups of objects, the ad platform can define the number of frames for the interactive advertisement. Then the ad platform can populate each frame with objects (e.g., set background, insert text, insert icons, modify text formatting, etc.) according to the advertisement format, as shown in FIGS. 5 and 6. In this implementation, the ad platform can define a template for each frame in the set of frames, the template defining regions of the frame into which the ad platform can insert objects in the set of objects extracted from the static asset. The ad platform can assign each region of the frame defined by the template to a category of object (e.g., an icon, a text block, a hyperlink, a logo, etc.) and can fill each region with a corresponding object in the set of objects extracted from the static asset accordingly. In response to the number of regions defined in the set of frames exceeding the number of objects in the set of objects, the ad platform can leave regions of the frames blank and/or can select objects similar to those extracted from the static asset from a standard library of objects to fill each region. For example, a frame can include a region for a 140-character text block, a region for an icon, and a region for a logo and brand mark. In this example, the ad platform can extract from a static asset a 110-character text block, a logo for a brand represented in the static asset, and content labels representing a theme of the static asset (e.g., "island", "tropical," and "beach"). Therefore, the ad platform can select an icon, such as a palm tree, from a standard library of graphics to correspond with the "tropical" theme of the 110-character text block and the brand logo extracted from the (original) static asset. The ad platform can then insert the selected icon into the frame.

Furthermore, in response to the number of objects in the set of objects exceeding the number of regions defined in the set of frames, the ad platform can selectively omit objects from the set of frames. For example, the ad platform can extract from a static asset: a 110-character text block; a logo for a brand represented in the static asset; a palm tree icon; and a beach-ball icon. However, the frame into which the ad platform compiles the set of objects exhibits only three regions: a region for a 140-character text block; a region for an icon; and a region for a logo and brand mark. The ad platform can determine that a beach-ball appears in another graphic render on other frames in the set of frames, and, therefore, the ad platform can prioritize the palm tree icon over the beach-ball icon to avoid duplicate graphics within the set of frames. Therefore, the ad platform can insert into the frame the 110-character text block, the logo for a brand represented in the static asset, and the palm tree icon. Alternatively, the ad platform can determine that the beach-ball bears more contextual similarities to other themes depicted within the set of frames (e.g., the text blocks include references to beach volleyball) and, therefore, the ad platform can insert into the frame the 110-character text block, the logo for the brand represented in the static asset, and the beach-ball icon.

As shown in FIG. 1A, the ad platform can also define an order in which the visual element renders frames in the set of frames. In one implementation, the ad platform can define the order to align with contextual themes within each frame in the set of frames, such that the frames, when rendered sequentially in order, portray a contiguous narrative, plot, or motif. Similarly, the ad platform can define the order such that a user may read text depicted in each frame logically and chronologically in sequence when the frames are rendered sequentially in order. For example, as described above, the ad platform can divide a text block within the static asset into multiple discrete text blocks each rendered on a different frame in the set of frames. The ad platform can, therefore, define the order of the set of frames to mimic the original order of the text block within the static asset. Alternatively, the ad platform can define the order of the frames based on the original layout or order of objects within the original static asset, according to a standard order defined by the advertisement format, and/or in any other suitable way.

Alternatively, the ad platform can assemble frames into a single column or into a grid array, and the ad platform can arrange these frames in any other order, such as chronologically from left to right, chronologically from top to bottom, or arranged pseudorandomly. The ad platform can also store boundary, corner, center, or other positional definitions for the location of each discrete region of the singular image corresponding to a frame selected.

In another variation shown in FIGS. 3-5, the ad platform assembles frames into a video file with each frame in the video file ordered chronologically, and the ad platform can then assign a unique timestamp (or serial number) to each frame. Upon insertion of an instance of the visual element and the video file into a webpage or other document, the visual element can link a unique timestamp (or serial number) corresponding to one frame in the video file to a unique range of positions occupied by the visual element within a window rendered on a display of a computing device navigating to the webpage. The visual element can thus seek forward, seek backward, and pause through frames in the video file as the visual element is moved up, moved down, and held in position within the window, respectively.

In yet another variation shown in FIG. 1A, the ad platform can store each frame as a static or still image, assign a serial number or other identifier to each still image, and generate a metadata file defining an order to the still image serial numbers. Upon insertion of an instance of the visual element into a webpage or other document, the visual element can preload each still image as a separate file, load the metadata file, and then implement methods and techniques described below to link a unique serial number corresponding to one still image to a unique range of positions occupied by the visual element within a window rendered on a display of a computing device navigating to the webpage. The visual element can thus selectively cycle through multiple discrete still image files as the visual element is moved up and down within the window.

However, the ad platform can store frames in any other format, in any other one or more static image or video files, and with any other metadata. Furthermore, the foregoing methods and techniques can be executed locally at the advertising portal (e.g., rather than at a remote server or remote computer system hosting the ad platform), such as within a web browser or native application executing on a computing device accessing the advertising portal.

In one variation, the ad platform can assemble the set of objects into a single, interactive frame; the visual element can then render the single, interactive frame and animate a crop area (or mask area) arranged over the single, interactive frame in response to interactions that move the visual element within a window as described below. Generally, in this variation, the ad platform functions to generate a visual element that contains multiple streams of content—related to a common theme—in multiple discrete information density tiers.

However, the ad platform can compile the set of objects into an advertisement format in any other suitable way.

6. Rendering Multiple Frames

Block S150 of the method S100 recites, at a visual element loaded into a window of a first computing device, sequentially rendering the set of frames according to the order responsive to an interaction at the first computing device that moves the visual element within the window. Generally, the visual element can render frames according to the order and/or animation defined by the ad platform for the interactive advertisement. As described above, the ad platform can select an advertisement format that defines the order in which frames are rendered, layout and orientation in which the frames are rendered within the visual element, and types of interactions that trigger animation of the interactive advertisement within the visual element.

In one implementation shown in FIGS. 3-5, the visual element and/or the ad platform can index through frames in the set of frames at a rate proportional to a scroll-rate of a scroll-event that moves the visual element vertically within a window of the computing device. In this implementation, the visual element can segment a height of the window (less a height of the visual element) into a number of discrete vertical position ranges equal to the number of frames in the set of frames selected and assign each discrete vertical position range to one frame in the set of frames. With the visual element thus loaded into a webpage or other document, the visual element then updates content shown within the visual element based on the position of the visual element within a window rendered on the computing device. In particular, as the webpage containing the visual element is moved up and down (or left and right) within the window, the visual element indexes through frames in the set of frames based on changes to the position of the visual element relative to the window, such as due to scroll-down and scroll-up inputs entered by the user into the computing device.

In one implementation, the visual element retrieves a relative position of the visual element within the window from the web browser (or other native application) hosting the webpage or other document in which the interactive visual ad is embedded. For example, the visual element can regularly query the web browser (or other native application) for its position relative to the window or display, such as at a rate of 24 Hz, and the web browser can return the position of the visual element (e.g., a top-left pixel of the visual element) relative to a reference position of the window (e.g., a top left pixel of the window). Alternatively, the visual element can regularly: query the web browser for scroll position of the webpage relative to the window, dimensions (e.g., pixel height and width) of the webpage, and window dimensions from the web browser; and calculate its position within the window from these data. Yet alternatively, the web browser can push one or more of these data to the visual element, such as at a regular rate or intermittently in response to an input (e.g., a scroll input) into the computing device. However, the visual element can determine its position within the window over time in any other way and based on any other data received from the web browser (or other native application).

Upon determination or receipt of a new relative position of the visual element within the window, the visual element can preserve a particular frame in the set of frames currently loaded into the visual element if the range of vertical positions assigned to the particular region of the static image file contains the new relative position of the visual element. However, if the range of vertical positions assigned to the particular frame in the set of frames does not contain the new relative position of the visual element, the visual element can replace the particular frame in the set of frames currently loaded into the visual element with a different frame in the set of frames assigned a range of vertical positions that does include the new relative position of the visual element within the window.

By repeating this process over time while the webpage containing the visual element is open within the web browser, the visual element can cycle through frames in the set of frames in response to scroll events occurring within the web browser that move the visual element relative to the window rendered on the computing device. Such position-driven updates of the visual element can manifest: as forward playback of a segment of a digital video represented in the set of frames at a frame rate corresponding to a speed at which the visual element is drawn from a bottom of the window toward the top of the window (i.e., a "scroll-down event"); as a rewind function or reverse playback of the same segment of the digital video at a frame rate corresponding to a speed at which the visual element is drawn from a top of the window toward the bottom of the window (i.e., a "scroll-up event"); and as pausing playback of the segment of the digital video in the absence of a scroll event at the window.

In one variation, the visual element and/or the ad platform can compile the subset of frames into a static image adjoined in a single column from bottom to top according to the order. To sequentially render the set of frames according to the order, the visual element can position a mask area over a first region of the static image—corresponding to a first frame in the set of frames—and render contents of the mask area within the visual element in response to the visual element falling within a particular range of positions within the window. In response to relocation of the visual element within the window, the visual element can index the mask area over the static image to a second region of the static image, corresponding to a second frame, and render contents of the mask area within the visual element. Additionally, in response to relocation of the visual element within the window to a range of positions proximal a top of the window, the visual element can index the mask area over a last region of the static image corresponding to a last frame in the set of frames and render contents of the mask area within the visual element. Accordingly, the visual element can play back frames in the set of frames at a frame rate proportional to a rate of a scroll event that moves the visual element within the window, thereby providing the impression of video playback controlled by scroll-rate.

In another implementation shown in FIG. 2, the visual element can compile the set of frames into a horizontal carousel such that the visual element can sequentially index through frames in the horizontal carousel in response to a horizontal scroll event over the visual element that shifts frames in the set of frames horizontally across the window. In this implementation, the ad platform, prior to serving the frames to the visual element, can generate a static image including the subset of frames adjoined in a single row in an order from left to right corresponding to the order of the set of frames. To index through each frame in the horizontal carousel, the visual element can index a mask (or crop) area over discrete regions of the static image at a rate corresponding to a rate of the horizontal scroll event over the visual element. In this implementation, each discrete region of the static image can correspond to a frame in the set of frames. The visual element can then render contents of the static image bounded by the mask area in response to each horizontal scroll event that shifts the static image horizontally within the visual element and across the window.

However, the visual element can implement any other method or technique to sequentially load frames selected during scroll-down events, scroll-up events, and/or horizontal scroll events occurring at the computing device.

6.1 Rendering a Single Frame

Block S154 of the method S100 recites rendering a single frame of the second interactive advertisement within the second visual element; animating the single frame responsive to a second interaction at the second computing device that moves the second visual element within the window in Block S154. Generally, the visual element can render and animate single frames within the visual element in response to relocation of the visual element within the window as shown in FIG. 2.

As described above, the ad platform can select an advertisement format that defines layout and orientation in which the single frame is rendered within the visual element and types of interactions that trigger animation of the interactive advertisement within the visual element.

In one implementation, the ad platform can animate a mask overlaid on the single image in response to interactions that move the visual element within the window. In this implementation, the visual element can selectively shift or remove portions of the mask as the visual element moves within the window. For example, as the visual element enters a bottom of the window, the visual element can render an opaque mask overlaid on (and obfuscating) the singular image within the visual element. In response to a scroll event that moves the visual element upward within the window, the visual element can selectively remove striations of the mask providing the appearance of blinds opening over the singular image. As the visual element approaches a top of the window, the visual element can remove more striations of the mask until the mask is transparent and the singular image is fully rendered within the visual element.

In another implementation shown in FIG. 2, the visual element can zoom into and out of the singular image based on position of the visual element within the window. For example, the ad platform can detect a focal point (e.g., a primary face of a primary character of a film advertised within the static asset, and/or other relevant features) within the static asset. Then the ad platform can generate an interactive advertisement including a single frame corresponding to the static asset, the focal point of the static asset centered within the single frame. The interactive advertisement can include rules dictating triggers and animations for rendering the single frame within the visual element. The ad platform can then serve the interactive advertisement to the visual element, which can render the single frame in response to a scroll event that moves the visual element into view in the window. In this implementation, the visual element can zoom into the single frame, a center of the zoom concentric with the focal point of the single frame in response to detecting a scroll-down event that moves the visual element downward within the window. Likewise, the visual element can zoom out of the focal point of the single frame in response to a scroll-up event that moves the visual element upward within the window. In this implementation, the visual element can define a zoom ratio proportional to a distance of the visual element from the top of the window.

In the foregoing example, the visual element can arrange a crop area over the single frame, an aspect ratio of the crop area proportional to an aspect ratio of the single frame. When the visual element is arranged proximal a top of the window, the visual element can render contents of the crop area within the visual element. To zoom into the focal point, the visual element can: define a zoom ratio based on a distance of the visual element from the top of the window; reduce dimensions of the crop area arranged over the single frame by the zoom ratio, the crop area centered over the focal point; and render contents of the crop area to fill one of a height or a width of the visual element. Similarly, to zoom out of the focal point, the visual element can: define a zoom ratio based on a distance of the visual element from the bottom of the window; increase dimensions of the crop area arranged over the single frame by the zoom ratio, a centroid of the crop area coincident the focal point; and render contents of the crop area to fill one of a height or a width of the visual element.

However, the visual element can implement any other method or technique to render and animate a singular frame during scroll-down events, scroll-up events, and/or horizontal scroll events occurring at the computing device.

7. Engagement Metric

Block S160 of the method recites, based on the interaction, generating an engagement metric for a user interacting with the visual element at the first computing device. Generally, the visual element can implement methods and techniques described above in the method S100 to characterize user engagement within the visual element and its content based on one or more interactions between the user and the webpage.

In particular, because the visual element updates content shown within the interactive advertisement based on the position of the visual element within a window rendered on a display of a computing device (i.e., in response to scroll-down and scroll-up events at the computing device), the visual element or the ad platform can generate metrics for user engagement with the interactive advertisement enabled by user controls integrated into the visual element.

In one implementation, the visual element maintains counts of: a number of scroll-down and scroll-up events occurring at the computing device while all or a portion of the visual element is shown in the window; a number of back-to-back scroll-down and scroll-up event pairs; a number of discrete scroll events at scroll speeds less than a threshold scroll speed or within a scroll speed range corresponding to historical peak user engagement; a number of times the visual element enters and exits the window; a maximum duration the advertisement remains continuously within the window; and/or a total duration the advertisement is shown within the visual element during a single access to the webpage containing the visual element at the computing device; etc. The visual element can also track: a duration of time that the visual element is shown within the window while the webpage or other document is accessed at the computing device; and a click-through event, including whether the user selected the interactive advertisement to navigate to an out-of-line video player or to another destination URL stored in the visual element metadata, as described above. For example, in addition to metrics described above, the visual element can append an engagement metric for the instance of the visual element loaded into the webpage with a total duration of the advertisement represented by frames remaining within view in the window before navigation to an alternate webpage or closure of the web browser at the computing device.

The visual element can also calculate an interaction quality for the instance of the interactive advertisement. For example, the visual element can classify user interaction with the interactive advertisement as: "no engagement" if the user rapidly (e.g., faster than a threshold speed) scrolls the visual element from the bottom of the window to the top of the window and does not revisit the visual element; "limited engagement" if less than 50% of the frames are rendered within the visual element; "moderate engagement" if the user slowly scrolls the visual element into the window and if 50-75% of the frames are rendered within the visual element; "good engagement" if the user scrolls up and then scrolls down once with the visual element within the window and if 75-100% of the frames are rendered within the visual element or within a native video player; and "excellent engagement" if the user scrolls up and scrolls down more than once following entry of the visual element into the window and 100% of the of the frames are rendered within the visual element or within the native video player. However, the visual element can implement any other method or technique to characterize user interactions with the visual element and its content.

In one variation, the visual element can calculate the engagement metric based on interactions relevant to a format of the advertisement evaluated by the engagement metric. For example, for a multiple frame advertisement in which a user applies an input to a computing device to index through frames horizontally, the visual element can calculate the engagement metric based on a number of horizontal scroll events and a number of frames rendered—in full—in the visual element. For a multiple frame advertisement in which a user applies an input to a computing device to index through frames vertically in response to scroll-up and scroll-down events, the visual element can calculate the engagement metric based on a number of scroll-up events, a number of scroll-down events, and a rate (e.g., average rate) of the scroll-up and scroll down-events. (A user who scrolls quickly through the frames may not completely view content in full.) For a single frame advertisement in which a user applies an input to animate the advertisement in the visual element, the visual element can calculate the engagement metric based on a number of vertical scroll events and/or changes in direction of the scroll events. Generally, the visual element can base the engagement metric on interactive events that account for variation in the methods in which visual content rendered in the visual element is animated to supply an accurate representation of how each advertisement engages (or fails to engage) users.

The visual element can then package any one or more of the user engagement metrics and return these user metric data to the publisher, advertiser, or other entity. Alternatively, the visual element can return raw interaction data (e.g., scroll event counts) as described above to the ad platform, and the ad platform can implement similar methods and techniques to transform these raw interaction data into one or more user engagement metrics and to then serve these engagement metrics to one or more external entities.

However, the visual element and/or the ad platform can generate and handle user engagement metrics of any other type in any other suitable way.

8. Format Optimization

In one variation shown in FIGS. 1C and 2, the ad platform can transform the static asset into a variety of formats (and/or into every possible ad format available) to generate a set of interactive advertisements and serve these interactive advertisements to a group of users to determine engagement with each interactive advertisement and, ultimately, converge on a high-engagement ad format for the particular asset. In particular, the ad platform can transform the asset into a first interactive advertisement according to a first advertisement format, the first advertisement format defining animation of a set of frames within the visual element responsive to a change of position of the visual element within the window in Block S132; and transform the static asset into a second interactive advertisement according to a second advertisement format, the second advertisement format defining animation of a single frame within the visual element responsive to a change of position of the visual element within the window in Block S134. Then the ad platform can serve the first interactive advertisement and the second interactive advertisement to computing devices within a network of computing devices to evaluate efficacy of different advertisement formats. Therefore, a first visual element rendered in a window rendered on a display of the first computing device can sequentially render the set of frames of the first interactive advertisement within the first visual element according to an order defined for the first interactive advertisement responsive to a first interaction at the first computing device that moves the first visual element within the window in Block S150; and, based on the first interaction at the computing device that moves the visual element within the window, generate a first engagement metric for a first user interacting with the first interactive advertisement rendered in the first visual element at the first computing device in Block S162. Similarly, a second visual element rendered in a window rendered on a display of the second computing device can: render the single frame of the second interactive advertisement within the second visual element; animating the single frame responsive to a second interaction at the second computing device that moves the second visual element within the window in Block S154; and, based on the second interaction, generating a second engagement metric for a second user interacting with the second interactive advertisement rendered in the second visual element at the second computing device in Block S164. In response to the first engagement metric exceeding the second engagement metric, the ad platform can identify (or extrapolate) the first interactive advertisement as a high-engagement advertisement format for the static asset and preferentially serve the first interactive advertisement to computing devices in lieu of the second interactive advertisement in Block S166.

Generally, the ad platform can transform a single static asset into a multitude of advertisement formats to generate a multitude of interactive advertisements. The ad platform can then serve the interactive advertisements to various computing devices (and users) to evaluate efficacy of each advertisement format for the single static asset by locally tracking engagement with each interactive advertisement (i.e., in the form of the engagement metric). Each computing device can then serve these engagement metrics to the ad platform, a remote interaction database, such as an ad server, a publisher's portal, an advertiser's portal, etc., which can then calculate from engagement metrics a high-engagement (or highly effective) advertisement format for the single static asset. Thereafter, the ad platform can select this high-engagement advertisement format when transforming static assets into interactive advertisements to ensure high-user engagement levels and attention.

The visual element and the ad platform can cooperate to transform a static asset into multiple different advertisement formats (e.g., with multiple frames and different scroll directions); and serve these different interactive advertisements (of different formats) to various users. As the visual element tracks user engagement with each format, the ad platform can identify a high-engagement (or high-yield) format. Over time, as the visual element continues to serve these different interactive advertisements to different users, the visual element can continue to track user engagement with each format. The visual element can therefore continue to evaluate efficacy of the high-engagement format, thereby improving confidence that the high-engagement format is a correct or optimal format for the static asset (and other similar static assets). Similarly, the ad platform can determine which advertisement formats yield high-returns (i.e., high engagement) for a particular brand that generates many similar static assets.

For example, in response to a first engagement metric of a first interactive advertisement exceeding a second engagement metric of a second interactive advertisement, the ad platform can selectively serve the first interactive advertisement preferentially (i.e., in lieu of serving the second interactive advertisement to a computing device) during a time window. In response to the first engagement metric exceeding the second engagement metric by more than a threshold offset, the ad platform can discard the second interactive advertisement from a set of available interactive advertisements available to serve to computing devices in the distributed network of computing devices in Block S168. However, in response to the first engagement metric exceeding the second engagement metric by less than the threshold offset, the ad platform can continue to serve the first interactive advertisement and the second interactive advertisement to computing devices in the distributed network of computing devices to garner additional engagement metrics evaluating user engagement with each of the first interactive advertisement and the second interactive advertisement. From these additional engagement metrics, the ad platform can converge on a high-engagement advertisement format for the static asset corresponding to the first advertisement format in Block S170 based on the first engagement metric and the third engagement metric; and, therefore, identify the second advertisement format as a low-engagement advertisement format for the static asset based on the second engagement metric and fourth engagement metric. Thus, the ad platform can preferentially serve the first interactive advertisement (of the first advertisement format) over the second interactive advertisement (of the second advertisement format).

Additionally or alternatively, the ad platform can extract trends in user preferences for particular formatting types by tracking user engagement with different advertisement formats. The ad platform can transform a particular static asset into a set of interactive advertisements of different formats and serve these interactive advertisements to the computing device of a particular user. The visual element can therefore compare the user's engagement with each advertisement format to discern a preferred advertisement format for the particular user. Additionally, the visual element can track engagement over time to discern changes in user preferences, user formatting preference for different categories of assets, schedules for when certain formats are more effective in engaging the user than other formats, etc. Furthermore, the visual element can extract trends in user formatting preferences to predict preferred interactive formats for users similar to (e.g., similar demographics) the user.

The visual element can identify a high-engagement advertisement format effective for a particular user, brand, and/or asset by identifying formats with relatively high engagement metrics (or engagement levels). After identifying the high-engagement advertisement, the ad platform can transform other static assets—similar or dissimilar—into the advertisement format in order to preempt user disengagement with advertising content and overall dissatisfaction with a brand associated with the static asset. Therefore, the ad platform can: access a second static asset including a second set of objects representing advertising content; extract the second set of objects from the second static asset; and generate a second interactive advertisement including the second set of objects and formatted according to the high-engagement advertisement format. Then the visual element can render the second interactive advertisement responsive to an interaction (e.g., a scroll event) at the visual element. The visual element and ad platform can repeat this process until the ad platform converges on an optimal format or a set of optimal formats in Block S170.

However, the ad platform and the visual element can cooperate to apply engagement data to select a high-engagement advertisement format in any other suitable way.

9. Real-Time

One variation of the method S100 shown in FIG. 1B includes, at a visual element loaded into a window rendered on a display of a computing device: at a first time, accessing a static asset comprising a set of objects representing advertising content in Block S110; extracting the set of objects from the static asset in Block S120; selecting an advertisement format from a set of advertisement formats based on a quality of the set of objects, the advertisement format defining animation of visual content within the visual element responsive to a change of position of visual element within the window in Block S138; transforming the static asset into an interactive advertisement according to the advertisement format in Block S148; and, at approximately the first time, rendering the interactive advertisement within the visual element responsive to an interaction at the computing device that moves the visual element within the window in Block S158. The variation of the method S100 further includes, based on the interaction at the computing device that moves the visual element within the window, generating an engagement metric for a user interacting with the visual element at the first computing device in Block S160.

Generally, in this variation, a visual element inserted into a webpage or other document rendered in a window displayed on a computing device can locally: access a static asset; select an advertisement format appropriate for the static asset based on characteristics of the static asset, such as quantity of objects, types of objects (e.g., faces, text, colors, color pallets, icons, and/or contextual information), etc.; and, substantially in real-time, transform the static image into an interactive advertisement according to the selected advertisement format.

9.1 Object Extraction & Format Selection

In this variation, the visual element can access a static asset in Block S110 and locally extract objects from a static asset through a locally-stored (e.g., in local storage) object-extractor module configured to implement machine learning, computer vision, pattern recognition, and/or natural language processing techniques to identify objects such as colors, content labels, faces, text blocks, features, images, qualities, etc. in Block S120. Additionally or alternatively, the visual element can identify a quality of the objects in the set of objects extracted from the static asset, such as type, number, concentration within the static image, themes, etc.

Block S138 of the method S100 recites selecting an advertisement format from a set of advertisement formats based on a quality of the set of objects, the advertisement format defining animation of visual content within the visual element responsive to a change of position of the visual element within the window. Generally, the visual element can select an advertisement format—from a set of predefined advertisement formats—into which the visual element can transform objects extracted from the static asset based on a set of selection rules defined by a particular quality or characteristic of the objects. In particular, the visual element can store a set of predefined advertisement formats (or templates)—such as the multi-frame and/or single frame interactive formats described above—within local storage at the computing device and selectively access these formats upon receipt of the static asset. The visual element can then select a particular advertisement based on a set of rules defined by the quality of the objects.

In one implementation, the visual element can select an advertisement format based on alignment between objects, such as content labels, assigned to the advertisement format and content labels extracted from the static asset. For example, the visual element can extract content labels indicating the static asset contains text and graphics related to "sale of a consumer electronic device." The visual element can then query local storage to return an advertisement format assigned content labels such as "sale," "consumer," "device," and/or "electronic." The visual element can then select an advertisement format in which one content label or a majority of the content labels assigned to the advertisement format align with content labels extracted from the static asset.

In another implementation, the visual element can select an advertisement format based on historical engagement data representing user attention to static assets of a particular type in various advertisement formats. By identifying a contextual, aesthetic, intended-use, and/or purpose of the static asset, the visual element can identify formats that yielded high levels of engagement for similar static assets in the past.

However, the visual element can implement any other technique and/or method to select an advertising format into which the visual element can compile objects to generate an interactive advertisement.

However, the ad platform, the visual element, and/or any other computing device or system can implement any other methods or techniques suitable to transform a static, passive asset into an interactive advertisement responsive to any other user interaction with advertising content rendered on a computing device.

Blocks of the method S100 and variations thereof described above can be executed by a visual element within a webpage accessed through a web browser, within a mobile or native application, or within any document of any other type accessed via any other application executing on a computing device, such as a smartphone, a smartwatch, a tablet computer, a laptop computer, or a desktop computer, or other computing device.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for generating and distributing digital advertising content comprising:

accessing a static graphical image depicting a set of visual objects representing advertising content;

extracting the set of visual objects from the static graphical image;

generating a set of frames;
for a first frame in the set of frames:
    selecting a first visual object from the set of visual objects; and
    inserting the first visual object into the first frame;
for a second frame in the set of frames:
    selecting a second visual object from the set of visual objects; and
    inserting the second visual object into the second frame;
defining an order for presenting the first frame and the second frame;
assembling the first frame and the second frame into a dynamic advertisement based on the order;
at a visual element loaded into a window of a first computing device, in response to a scroll event that moves the visual element upward within the window, sequentially rendering the first frame and the second frame, in the dynamic advertisement, in the visual element according to the order and at a rate proportional to a magnitude of the scroll event; and
based on the scroll event, generating an engagement metric for a user interacting with the visual element at the first computing device.

2. The method of claim 1:
wherein extracting the set of visual objects from the static graphical image assct comprises:
    serving the static graphical image to a third-party image feature extractor;
    at the first computing device, receiving the set of visual objects comprising a set of discrete text blocks, a set of colors; and
    at the first computing device, receiving a set of characteristics of advertising content in the static graphical image;
further comprising selecting an advertisement format from a set of advertisement formats based on the set of characteristics of advertising content in the static graphical image, the advertisement format defining animation of visual content within the visual element responsive to a change of position of the visual element within the window; and
wherein sequentially rendering the first frame and the second frame comprises rendering the first frame and the second frame in the visual element according to the advertisement format.

3. The method of claim 1:
wherein accessing the static graphical image comprises accessing the static graphical image comprising the set of visual objects defining a set of discrete text blocks arranged in the static graphical image;
wherein generating the set of frames comprises:
    generating the first frame, in the set of frames, comprising the static graphical image; and
    generating a subset of frames succeeding the first frame, in the set of frames, wherein each frame in the subset of frames comprises one text block from the set of discrete text blocks;
wherein assembling the set of frames into the dynamic advertisement comprises compiling the set of frames into a horizontal carousel within the visual element based on the order; and
wherein sequentially rendering the set of frames according to the order responsive to the scroll event at the visual element comprises:
    detecting a horizontal scroll event applied over the horizontal carousel rendered in the visual element; and
    in response to the horizontal scroll event, sequentially indexing through frames in the set of frames in the horizontal carousel rendered in the visual element according to the order in response to the horizontal scroll event applied over the visual element shifting frames in the set of frames horizontally across the window.

4. The method of claim 3:
wherein compiling the set of frames into the horizontal carousel within the visual element comprises generating a static image comprising the subset of frames adjoined in a single row in an order from left to right corresponding to the order of the set of frames; and
wherein sequentially indexing through each frame in the set of frames in the horizontal carousel rendered in the visual element comprises:
    indexing a mask area over discrete regions of the static image at a rate corresponding to a rate of the horizontal scroll event over the visual element, each discrete region of the static image corresponding to a frame in the set of frames; and
    rendering contents bounded by the mask area within the visual element in response to the horizontal scroll event.

5. The method of claim 3:
wherein accessing the static graphical image comprises accessing the static graphical image comprising a link to an external webpage;
wherein generating the set of frames comprises generating a last frame in the set of frames; and
further comprising:
    inserting a prompt to navigate to the external webpage, via the link, into the last frame; and
    at the visual element loaded into the window of the first computing device, in response to the scroll event, sequentially rendering the last frame following the second frame, in the dynamic advertisement, in the visual element.

6. The method of claim 3, wherein generating the engagement metric based on the scroll event comprises:
    calculating the engagement metric for the static graphical image based on a number of scroll events that move the visual element within the window; and
    serving the engagement metric to a remote interaction database.

7. The method of claim 1:
wherein assembling the set of frames into the dynamic advertisement based on the order comprises compiling the set of frames into a static image adjoined in a single column from bottom to top according to the order;
wherein sequentially rendering the set of frames according to the order responsive to the scroll event at the visual element comprises:
    in response to the visual element falling within a first range of positions within the window, rendering a first region of the static image corresponding to a first frame, in the set of frames, in the visual element at a first time by positioning a mask area over the first region of the static image and rendering contents of the mask area within the visual element;
    in response to the visual element falling within a second range of positions within the window above the first range of positions within the window, rendering a second region of the static image corresponding to a second frame, in the set of frames, in the visual element at a second time by indexing the mask area over the second region of the static image and rendering contents of the mask area within the visual element; and in response to the visual element falling within a third range of positions within the window above the second range of positions within the window, rendering a last region of the static image corresponding to a last frame, in the set of frames, in the visual element at a third time by indexing the mask area over the last region of the static image and rendering contents of the mask area within the visual element.

8. The method of claim 7, wherein generating the engagement metric based on the scroll event comprises:
calculating the engagement metric for the static graphical image based on a number of scroll events and duration of scroll events occurring at the first computing device; and
serving the engagement metric to a remote interaction database.

9. The method of claim 1, wherein accessing the static graphical image comprises accessing a single digital 300-pixel by 250-pixel static advertisement image containing the set of visual objects comprising text blocks, colors, and content related to advertisement of a particular brand.

10. The method of claim 1, wherein inserting the first visual object into the first frame comprises:
inserting the first visual object into the first frame; and
inserting a first graphic from a library of standard graphics into the first frame.

11. A method for generating and distributing advertising content comprising:
at a visual element loaded into a window rendered on a display of a computing device:
at a first time, accessing a static graphical image depicting a set of visual objects representing advertising content;
extracting the set of visual objects from the static graphical image asset;
selecting an advertisement format from a set of advertisement formats based on a quality of the set of visual objects, the advertisement format defining animation of visual content within the visual element responsive to a change of position of the visual element within the window;
transforming the static graphical image into an interactive advertisement comprising the set of visual objects based on the advertisement format;
at approximately the first time, rendering the interactive advertisement within the visual element responsive to an interaction at the computing device that moves the visual element within the window; and
based on the interaction at the computing device that moves the visual element within the window, generating an engagement metric for a user interacting with the visual element at the computing device.

12. The method of claim 11:
wherein selecting the advertisement format for the static graphical image asset from the set of advertisement formats and transforming the static graphical image asset into the interactive advertisement comprises:
in response to a threshold number of visual objects exceeding a number quantity of visual objects in the set of visual objects, generating a single frame comprising the set of visual objects according to a first advertisement format;

in response to the number quantity of visual objects in the set of visual objects exceeding the threshold number of visual objects:
generating a set of frames; and
for each frame in the set of frames:
selecting a visual object from the set of visual objects; and
inserting the visual object in the set of visual objects into the frame according to a second advertisement format; and
wherein rendering the interactive advertisement responsive to an interaction at the visual element comprises:
in response to the threshold number of visual objects exceeding the number of visual objects in the set of visual objects, rendering the single frame in the visual element with the set of visual objects in the single frame animated according to an animation defined by the first advertisement format in response to a scroll event within the window; and
in response to the number of visual objects in the set of visual objects exceeding the threshold quantity of visual objects, sequentially rendering the set of frames according to an order defined for the set of frames by the second advertisement format in response to a scroll event within the window.

13. The method of claim 11:
wherein selecting the advertisement format for the static graphical image asset from the set of advertisement formats comprises:
at the first time, selecting a first advertisement format specifying one frame; and
at a second time, selecting a second advertisement format specifying multiple frames;
wherein transforming the static graphical image into an interactive advertisement according to the advertisement format comprises:
at approximately the first time, transforming the static graphical image into a first interactive advertisement by inserting the set of visual objects into a single frame according to the first advertisement format at the computing device;
at the computing device at approximately the second time, transforming the static graphical image into a second interactive advertisement by, for each frame in the set of frames:
selecting a visual object from the set of visual objects; and
inserting the visual object in the set of visual objects into the frame, for each frame in the set of frames, according to the second advertisement format at the computing device;
wherein generating the engagement metric based on the interaction comprises:
generating a first engagement metric representing interaction by a user with the first advertisement based on a number of vertical scroll events over the visual element; and
generating a second engagement metric representing interaction by a user with the second advertisement format based on a number of frames in the set of frames rendered within the visual element; and
identifying the second advertisement format as a high-engagement advertisement format for the user in response to the second engagement metric exceeding the first engagement metric.

14. The method of claim 13, further comprising, at a third time succeeding the second time:

accessing a second static graphical image comprising a second set of visual objects representing advertising content;

extracting the second set of visual objects from the second static graphical image;

generating a third interactive advertisement comprising the second set of visual objects based on the second advertisement format; and rendering the third interactive advertisement within a third visual element loaded into a third window rendered on the display.

15. The method of claim 11:

wherein extracting the set of visual objects from the static graphical image comprises detecting a focal point within the static graphical image;

wherein transforming the static graphical image into the interactive advertisement according to the advertisement format comprises generating a single frame corresponding to the static graphical image and projecting the focal point onto the single frame;

wherein rendering the interactive advertisement within the visual element comprises:

rendering the single frame in the visual element in response to a scroll event that moves the visual element into view in the window;

zooming in toward the focal point of the single frame in response to a scroll-down event that moves the visual element downward within the window; and zooming outwardly from the focal point of the single frame in response to a scroll-up event that moves the visual element upward within the window.

16. The method of claim 15:

wherein detecting the focal point within the static graphical image comprises detecting a primary face within the static graphical image and locating the focal point over the primary face;

wherein rendering the single frame in the visual element comprises:

arranging a crop area over the single frame, an aspect ratio of the crop area proportional to an aspect ratio of the single frame; and rendering contents of the crop area within the visual element arranged proximal a top of the window;

wherein zooming into the focal point of the single frame comprises:

defining a first zoom ratio based on a distance of the visual element from the top of the window;

reducing dimensions of the crop area arranged over the single frame by the first zoom ratio, the crop area centered over the primary face; and rendering contents of the crop area to fill one of a height or a width of the visual element.

17. The method of claim 1:

wherein accessing the static graphical image, generating the set of frames, inserting the first visual object into the first frame, inserting the second visual object into the second frame, defining the order, and assembling the set of frames into the dynamic advertisement comprises, at the first computing device:

receiving the static graphical image from a remote database;

generating the set of frames;

inserting the first visual object into the first frame;

inserting the second visual object into the second frame; and defining the order;

wherein assembling the set of frames into the dynamic advertisement comprises, at the first computing device, assembling the set of frames into the dynamic advertisement; and further comprising discarding the dynamic advertisement in response to after rendering the dynamic advertisement within the window.

18. The method of claim 1:

wherein inserting the first visual object into the first frame, inserting the second visual object into the second frame, defining the order, and assembling the set of frames into the dynamic advertisement comprises, at a remote computer system:

generating the set of frames;

inserting the first visual object into the first frame;

inserting the second visual object into the second frame;

for each frame in the set of frames, defining the order; and assembling the set of frames into the dynamic advertisement based on a first dynamic advertisement format; and further comprising, at the remote computer system, serving the dynamic advertisement to the first computing device;

further comprising, at the remote computer system, based on a second dynamic advertisement format:

generating a second set of frames;

for each a third frame in the second set of frames:

selecting a third visual object from the set of visual objects; and inserting the third visual object into the third frame;

for a fourth frame in the second set of frames:

selecting a fourth visual object from the set of visual objects; and inserting the fourth visual object into the fourth frame;

defining a second order for presenting the second set of frames; and assembling the second set of frames into a second dynamic advertisement based on the order;

further comprising, at the remote computer system, serving the second dynamic advertisement to a second computing device;

further comprising:

at a second visual element loaded into a second window of the second computing device, sequentially rendering the second set of frames, in the second dynamic advertisement, according to the second order responsive to a second interaction at the second computing device that moves the second visual element within the second window; and based on the second interaction, generating a second engagement metric for a second user interacting with the second visual element at the second computing device.

19. The method of claim 1:

wherein extracting the set of visual objects from the static graphical image comprises:

detecting the first visual object in a first location within the static graphical image;

detecting the second visual object in a second location within the static graphical image;

wherein generating the set of frames comprises:
  generating a first frame; and
  generating a second frame;
wherein inserting the first visual object into the first frame comprises inserting the first visual object into the first frame at a third location different from the first location; and
wherein inserting the second visual object into the second frame comprises inserting the second visual object into the second frame at a fourth location different from the second location.

20. A method for generating and distributing digital advertising content comprising:
  accessing a static graphical image depicting a set of visual objects representing advertising content;
  extracting the set of visual objects from the static graphical image;
  generating a set of frames;
  for a first frame in the set of frames:
    selecting a first visual object from the set of visual objects; and
    inserting the first visual object into the first frame;
  for a second frame in the set of frames:
    selecting a second visual object from the set of visual objects; and
    inserting the second visual object into the second frame;
  defining an order for presenting the first frame and the second frame;
  assembling the first frame and the second frame into a dynamic advertisement based on the order;
  at a visual element loaded into a window of a first computing device:
    in response to a horizontal swipe event that moves the visual element horizontally within the window, sequentially rendering the first frame the second frame, in the dynamic advertisement, according to the order, into the visual element at a rate proportional to the horizontal swipe event;
    sequentially rendering the set of frames, in the dynamic advertisement, according to the order responsive to an interaction at the first computing device that moves the visual element within the window; and
  based on the horizontal swipe event, generating an engagement metric for a user interacting with the visual element at the first computing device.

* * * * *